(12) United States Patent  (10) Patent No.: US 8,539,851 B2
Hoffman  (45) Date of Patent: Sep. 24, 2013

(54) MODULAR AUTOMATIC TRANSMISSION SHIFT DEVICE

(76) Inventor: Lawrence Andrew Hoffman, Portland, OR (US)

( * ) Notice: Subject to any disclaimer, the term of this patent is extended or adjusted under 35 U.S.C. 154(b) by 350 days.

(21) Appl. No.: 12/881,558

(22) Filed: Sep. 14, 2010

(65) Prior Publication Data

US 2012/0060635 A1  Mar. 15, 2012

(51) Int. Cl.
*B60K 20/00* (2006.01)

(52) U.S. Cl.
USPC ............. 74/473.25; 74/473.1; 74/473.3

(58) Field of Classification Search
USPC ................................................. 74/473.25
See application file for complete search history.

(56) References Cited

U.S. PATENT DOCUMENTS

| | | | | | |
|---|---|---|---|---|---|
| 4,328,712 | A | * | 5/1982 | Osborn | 74/473.23 |
| 4,485,689 | A | * | 12/1984 | Cambria | 74/473.21 |
| 4,905,802 | A | * | 3/1990 | Gotoh | 70/245 |
| 5,220,984 | A | * | 6/1993 | Ruiter | 192/220.4 |
| 5,309,783 | A | * | 5/1994 | Doolittle et al. | 74/473.21 |
| 5,309,787 | A | * | 5/1994 | Soyka et al. | 74/527 |
| 5,372,051 | A | * | 12/1994 | Kanematsu et al. | 74/473.25 |
| 5,845,534 | A | * | 12/1998 | Kim | 74/473.12 |
| 6,142,034 | A | * | 11/2000 | Rempinski | 74/473.22 |
| 6,295,886 | B1 | * | 10/2001 | Russell | 74/473.18 |
| 6,324,928 | B1 | * | 12/2001 | Hughes | 74/335 |
| 6,339,968 | B1 | * | 1/2002 | Nagashima | 74/473.25 |
| 6,708,581 | B1 | * | 3/2004 | Giefer et al. | 74/473.18 |
| 6,789,444 | B2 | * | 9/2004 | Fujiwara et al. | 74/473.23 |
| 6,852,065 | B2 | * | 2/2005 | Yamada et al. | 477/99 |
| 7,210,370 | B2 | * | 5/2007 | Giefer et al. | 74/473.18 |
| 7,308,838 | B2 | * | 12/2007 | Inoguchi et al. | 74/473.23 |
| 7,322,457 | B2 | * | 1/2008 | Giefer et al. | 192/219.4 |
| 7,467,569 | B2 | * | 12/2008 | Wang | 74/473.21 |
| 7,587,958 | B2 | * | 9/2009 | Gorman et al. | 74/473.25 |
| 7,597,022 | B2 | * | 10/2009 | Wang | 74/473.21 |
| 7,628,092 | B2 | * | 12/2009 | Chen et al. | 74/473.23 |
| 8,197,387 | B2 | * | 6/2012 | Vermeersch et al. | 477/99 |
| 2002/0112557 | A1 | * | 8/2002 | Burger | 74/473.3 |
| 2004/0112162 | A1 | * | 6/2004 | Hermanson | 74/473.25 |
| 2004/0182191 | A1 | * | 9/2004 | Kondo et al. | 74/473.3 |
| 2009/0272217 | A1 | * | 11/2009 | Howe et al. | 74/473.25 |
| 2010/0083784 | A1 | * | 4/2010 | Bortolon et al. | 74/473.21 |
| 2010/0083785 | A1 | * | 4/2010 | Doelling et al. | 74/473.25 |
| 2011/0048155 | A1 | * | 3/2011 | Drabek et al. | 74/473.25 |
| 2012/0079907 | A1 | * | 4/2012 | Wikner et al. | 74/473.25 |

\* cited by examiner

*Primary Examiner* — Troy Chambers
*Assistant Examiner* — Zakaria Elahmadi
(74) *Attorney, Agent, or Firm* — Mark S. Hubert

(57) ABSTRACT

A modular shift device for an automatic transmission having a first module adapted for pushbutton operation of the transmission's safety lockout, and a second module that when coupled to the first module, modifies operation of the transmission's safety lockout to that of shift shaft tilting and eliminates the pushbutton.

7 Claims, 9 Drawing Sheets

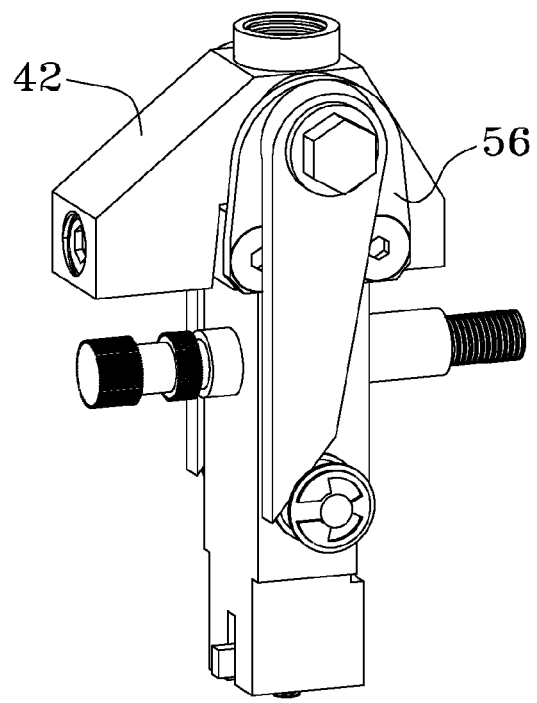
FIG. 2
FIG. 3
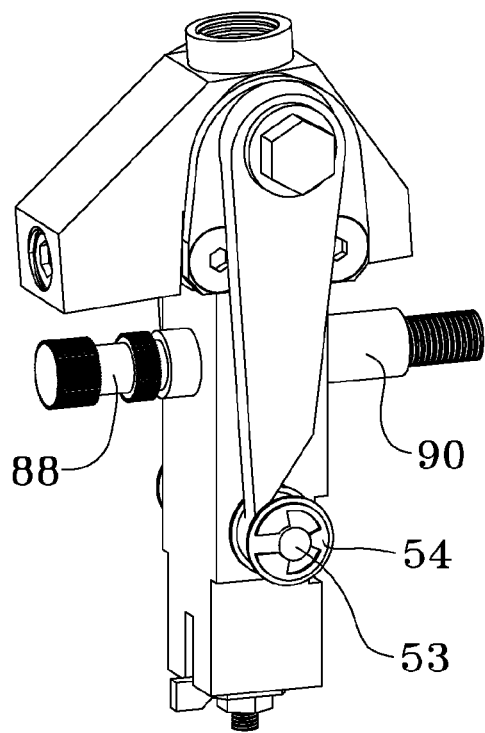

FIG. 6
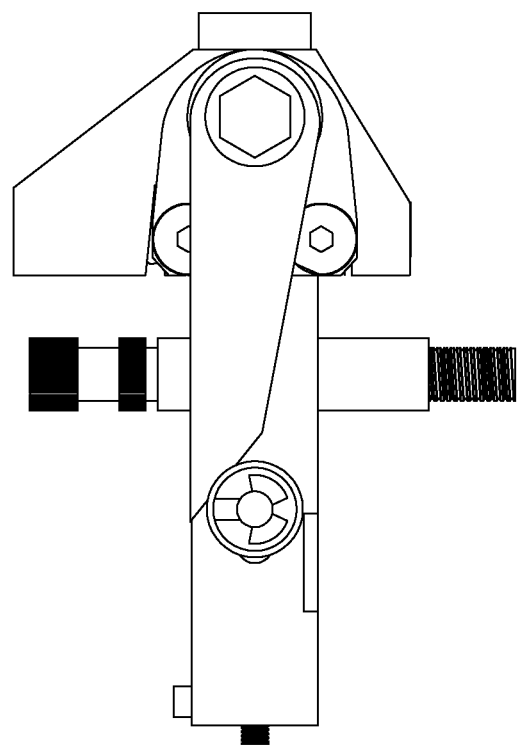
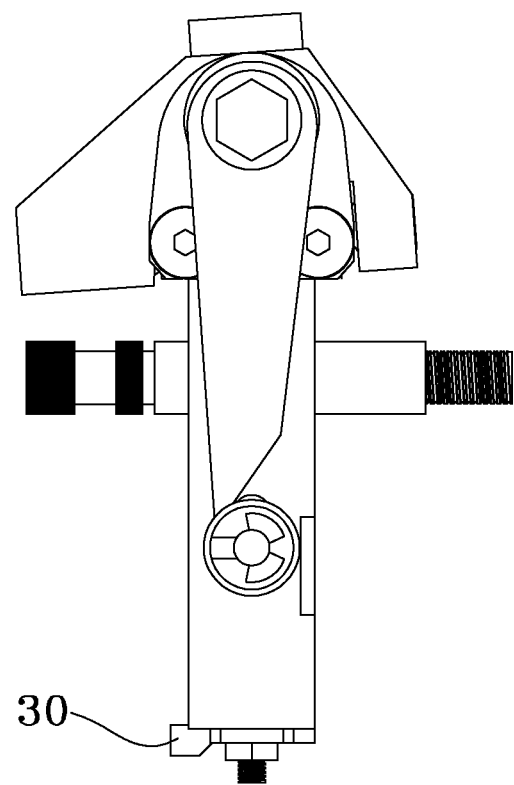
FIG. 7
30

FIG. 8
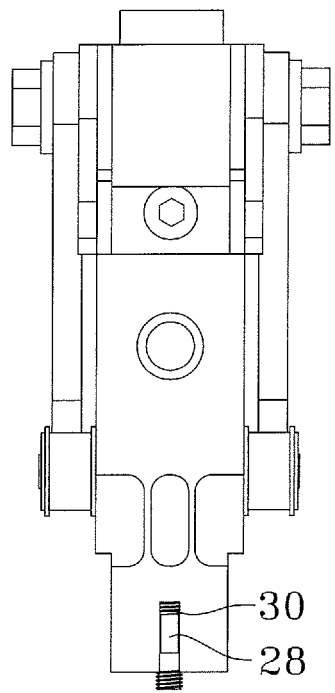
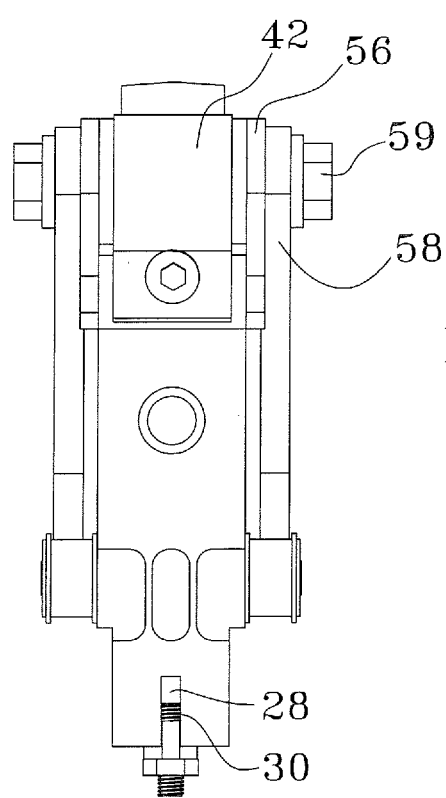
FIG. 9

MODULAR AUTOMATIC TRANSMISSION SHIFT DEVICE

BACKGROUND OF THE INVENTION

The present invention relates to a mechanical linear pushbutton actuation device that mounts atop of a mechanical pushbutton that requires linear movement after the depression of the pushbutton to accomplish the end result. The linear axis of the actuation device when resting, resides either parallel or in line with that of the pushbutton's linear axis. The actuation device changes the activating motion from that of depressing the pushbutton to that of tilting the actuation device with respect to its resting linear axis. The actuation device has a plethora of practical applications. Such an application is for a shift device for an automatic transmission adapted to allow the purchaser to customize the way his automatic transmission is able to engage the gears.

Automatic transmission shifters allow the free movement between drive and neutral but not the reverse, or not between reverse and neutral or the other drive gears without disengaging a pin that lockingly engages at various detent positions in the transmission shift gate. This is known as the safety lock out.

Traditionally this disengagement of the safety lock out is accomplished by either depressing a button located on the shifter knob or shaft or by moving the shifter shaft to the side or in a pattern to navigate beyond the various detent positions. Each method has its own advantages and disadvantages. The use of custom accessories that adorn the shifter shaft must be able to accommodate the button if that is the type of shifting used. Often this means that decorative oversized shifter knobs cannot be used.

Henceforth, a mechanical linear pushbutton actuation device that may be utilized as a modular automatic transmission shift device that allows purchasers to determine how their transmission shift gate locking and unlocking functioned, would fulfill a long felt need in the automotive customizing industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a mechanical linear pushbutton actuation device that when coupled to an existing pushbutton will provide an alternate method of engaging and disengaging the mechanical lockout of an automatic transmission shift device. This that is able to allow the purchaser to set how their transmission disengages from the shift gate to select the gear. The device has essentially two modules; a lower module incorporating a body necessary for button shifting and an upper module that has a body that mechanically couples to the lower module and changes the safety lock out button disengagement to a method of shifting accomplished wherein the safety lock out is disengaged by the slight sideways movement of the shifter shaft. The lower module mechanically attaches to the vehicle's commercial or aftermarket mounting plate assembly and utilizes the shift gate of that assembly. This reduces the cost. The two modules of the automatic transmission shift device are to be sold separately and utilize the vehicle's existing main plate and side brackets for mounting. In this way a car owner has the ability to quickly and inexpensively alter his manner of automatic transmission shifting to accommodate his level of comfort or customization by the addition or removal of an automatic transmission shift device's upper module.

The modular, automatic transmission shift device has many of the advantages mentioned heretofore and many novel features that result in a new invention which is not anticipated, rendered obvious, suggested, or even implied by any of the prior art, either alone or in any combination thereof.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

BRIEF DESCRIPTION OF THE DRAWINGS

FIG. 2 is a side view of the mechanical linear pushbutton actuation device utilized as a modular automatic transmission shift device;

FIG. 3 is a side perspective view of the mechanical linear pushbutton actuation device utilized as a modular automatic transmission shift device with the safety lock out disengaged;

FIG. 6 is a side view of the mechanical linear pushbutton actuation device utilized as a modular automatic transmission shift device;

FIG. 7 is a side view of the mechanical linear pushbutton actuation device utilized as a modular automatic transmission shift device with the safety lock out disengaged;

FIG. 8 is an end view of the mechanical linear pushbutton actuation device utilized as a modular automatic transmission shift device;

FIG. 9 is an end view of the mechanical linear pushbutton actuation device utilized as a modular automatic transmission shift device with the safety lock out disengaged;

DETAILED DESCRIPTION

Figure 1:
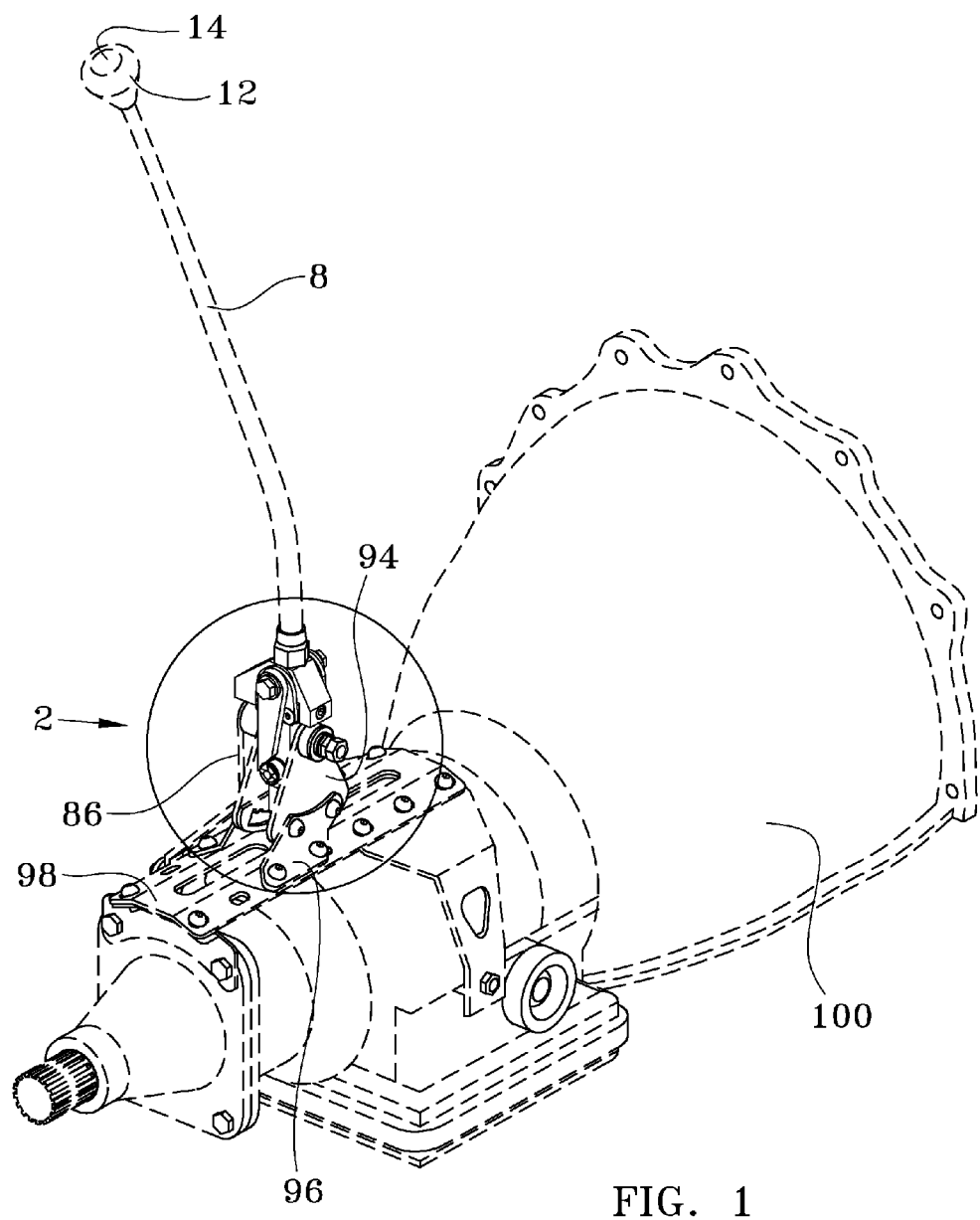
FIG. 1 is a front perspective view of the mechanical linear pushbutton actuation device utilized as a modular automatic transmission shift device coupled to an automatic transmission.
Figure 4:
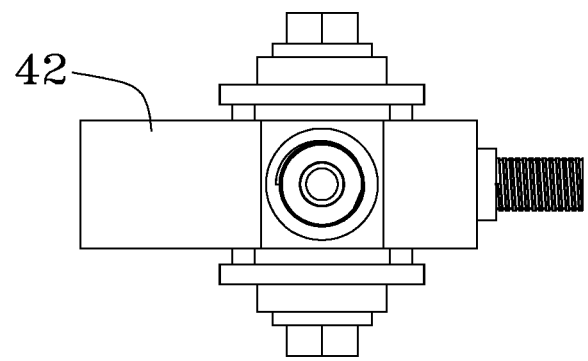
FIG. 4 is a top view of the mechanical linear pushbutton actuation device utilized as a modular automatic transmission shift device.
Figure 5:
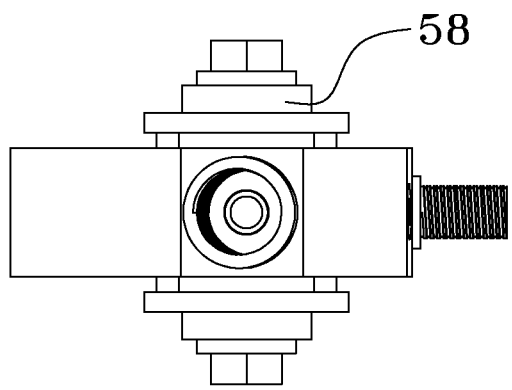
FIG. 5 is a top view of the mechanical linear pushbutton actuation device utilized as a modular automatic transmission shift device with the safety lock out disengaged.
Figure 10:
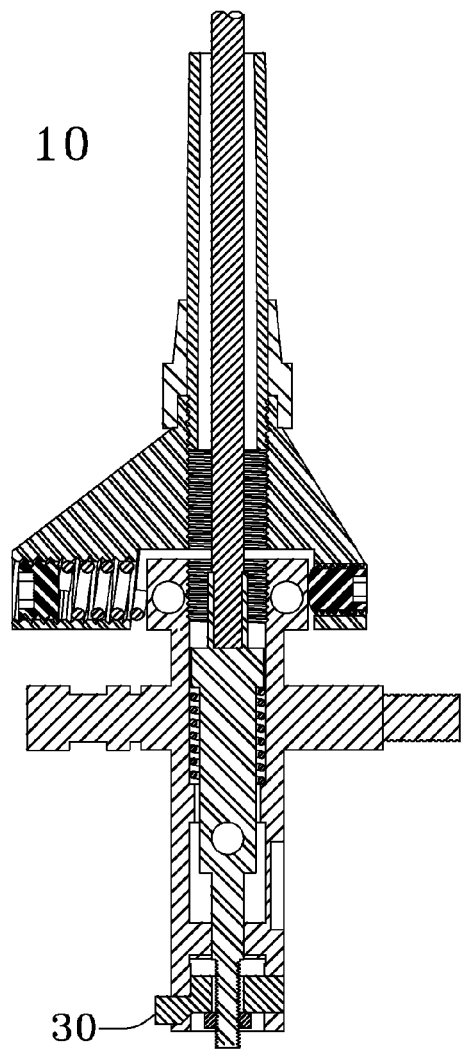
FIG. 10 is a cross sectional side view of the mechanical linear pushbutton actuation device utilized as a modular automatic transmission shift device.

There has thus been outlined, rather broadly, the more important features of the invention in order that the detailed description thereof that follows may be better understood and in order that the present contribution to the art may be better appreciated. Herein is described a mechanical linear pushbutton actuation device. In its best mode of use it is intended to be utilized as a modular automatic transmission shift device that allows the disengagement and engagement of the safety lock out system of an automatic transmission. This lock out system is accomplished by a mechanical interference between a movable pin and a shift gate plate (as is well known in the art.) There are, of course, additional features of the invention that will be described hereinafter and which will form the subject matter of the claims appended hereto. The operation of the mechanical linear pushbutton actuation device herein will be discussed as utilized for its intended purpose or best mode although it will be appreciated that it has wide applications where ever mechanical linear pushbuttons are used.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 14:
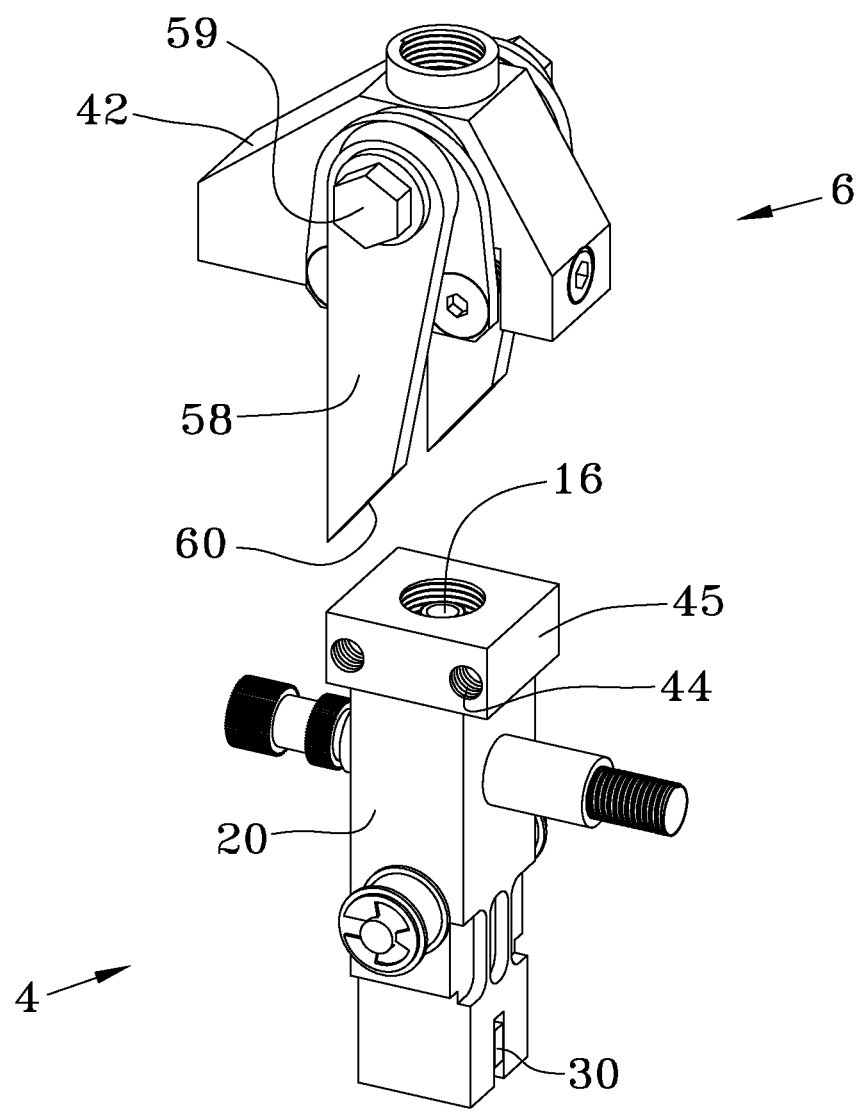
FIG. 14 is an enlarged perspective view of the mechanical linear pushbutton actuation device utilized as a modular automatic transmission shift device of FIG. 1.
Figure 15:
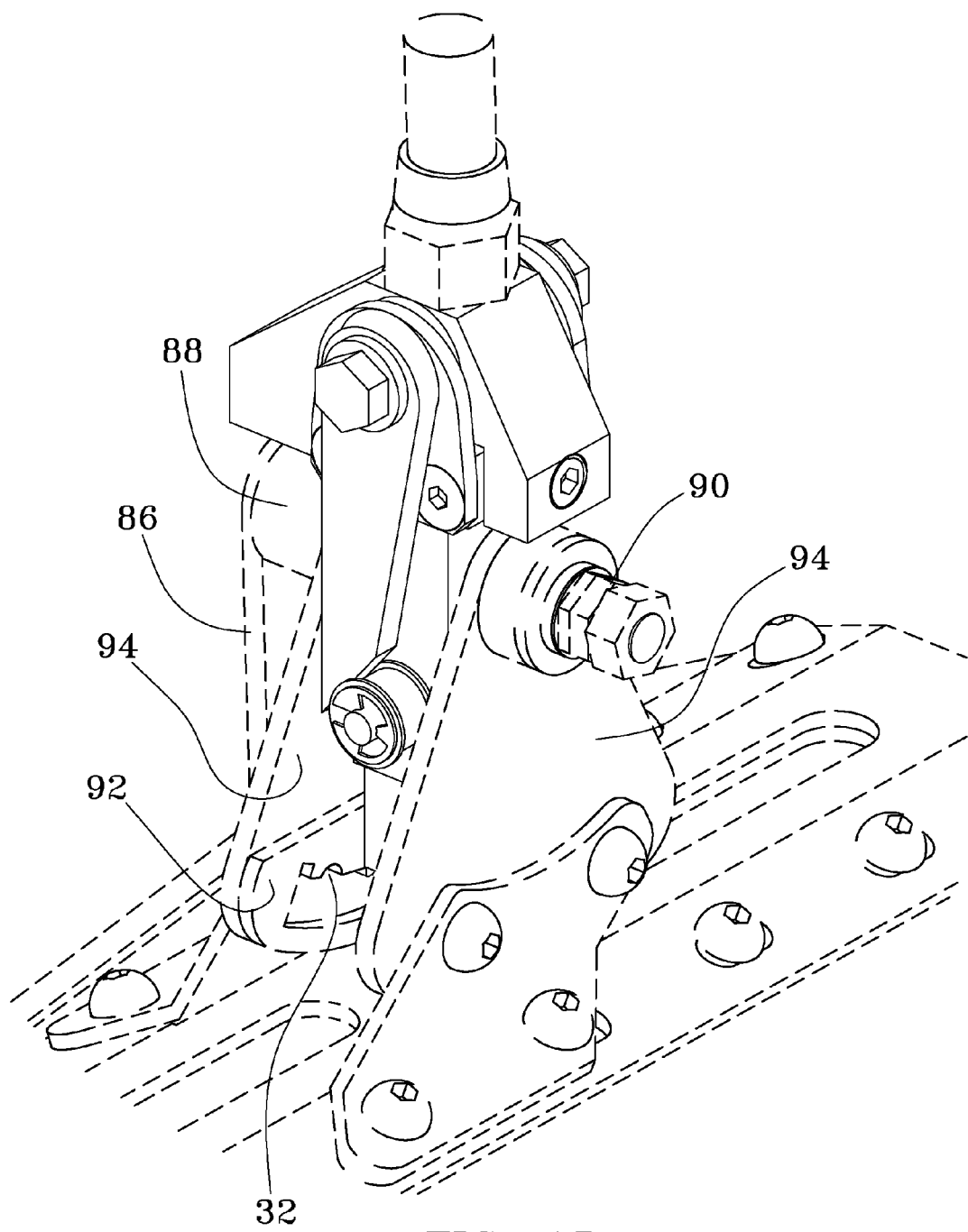
FIG. 15 is a perspective view of the mechanical linear pushbutton actuation device utilized as a modular automatic transmission shift.

Looking at FIGS. 1 and 15 the modular automatic transmission shift device 2 coupled to an automatic transmission case 100 can best be seen. The transmission main plates 98 and side plates 96 mechanically connect together to form the mounting plate assembly which is an inverted cradle assembly that bolts to the top side of the automatic transmission case 100. This mounting plate assembly provides a stable platform upon which the shifter support assembly 94 is affixed and extends normally therefrom. Onto the shifter support assembly 94 a shift gate plate 92, a shift linkage 86 and a pivotable modular automatic transmission shift device 2 made up of the combination of the lower button module 4 and the upper tilt module 6 is attached. (See FIG. 14) A shifter shaft 8 is connected to the top end of the lower module 4. The shift device 2 pivoting occurs about a first pivot arm 90 and a second pivot arm 88 that each extend normally from the lower module 4 at 180 degrees apart. (See FIG. 3) The second pivot arm 88 connects to the shift linkage 86 while the first pivot 90 arm allows for mechanical connection to the shifter support assembly 94. Both pivot arms extend through orifices in the shifter support assembly 94 which serve to support and allow pivotal motion of the shift device 2 and the shifter shaft 8.

Figure 11:
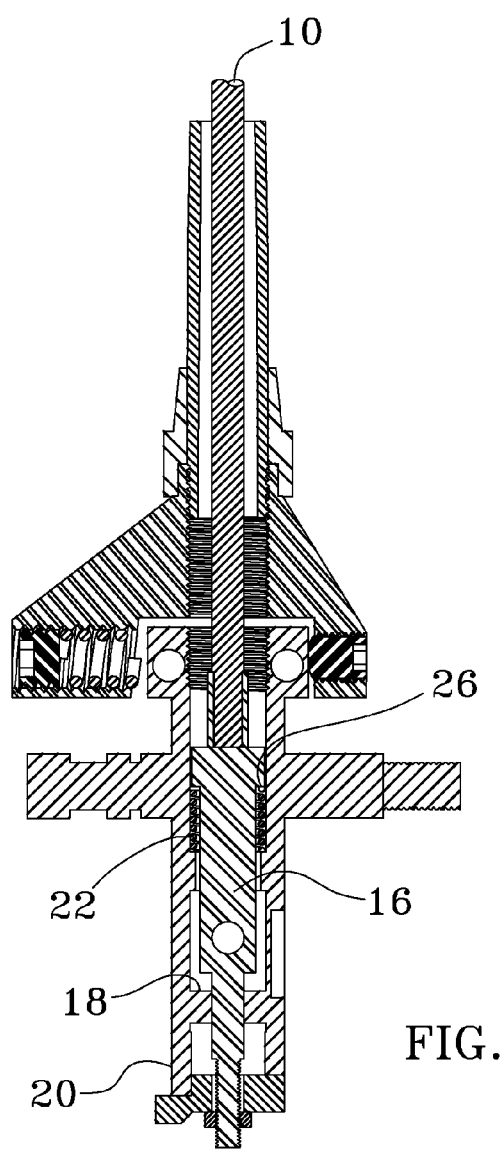
FIG. 11 is a cross sectional side view of the mechanical linear pushbutton actuation device utilized as a modular automatic transmission shift device with the safety lock out disengaged.
Figure 12:
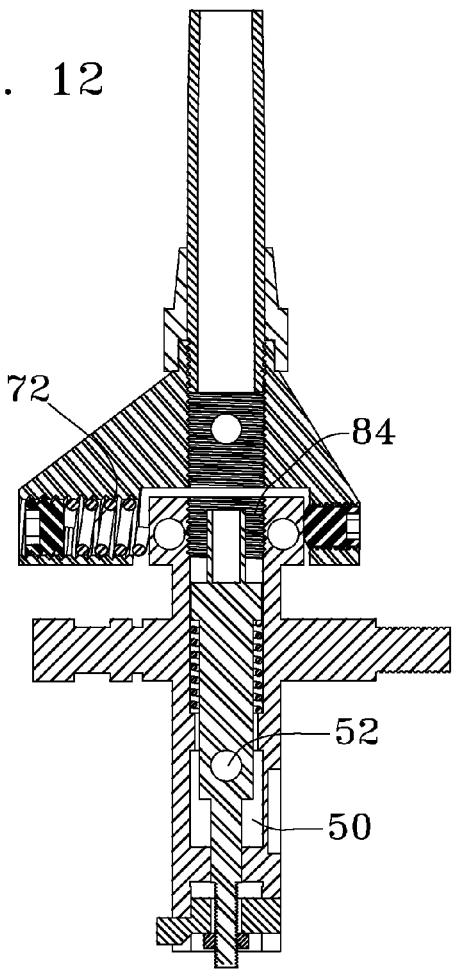
FIG. 12 is a cross sectional side view of the mechanical linear pushbutton actuation device utilized as a modular automatic transmission shift device.
Figure 13:
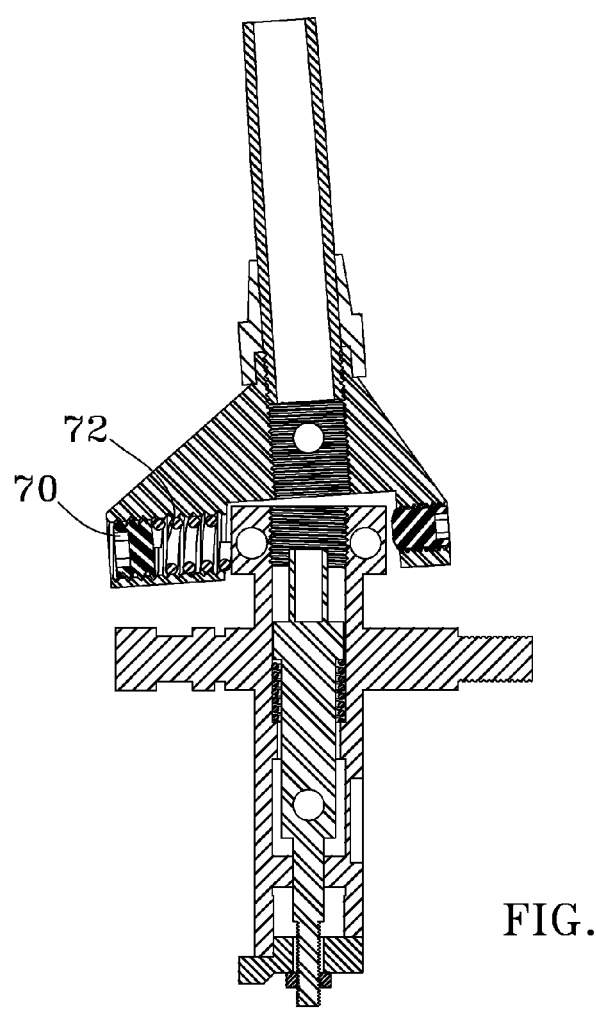
FIG. 13 is a side cross sectional view of the mechanical linear pushbutton actuation device utilized as a modular automatic transmission shift device with the safety lock out disengaged.

The shift linkage 86, shift device 2 and shifter shaft 8 all move in unison together in the same plane. The lower module 4 and the upper module 6 of the shift device 2 each can threadingly engage to couple to the bottom end of the shift shaft 8, which is hollow to accommodate a depressable flex shaft 10. (See FIG. 11) The upper end of the shift shaft 8 is connected to a shift knob 12 that may have a depressable button 14 thereon that is operationally coupled to the top end of the flex shaft 10. The lower end of the flex shaft 10 is coupled to the safety lock out disengagement plunger 16 housed within a longitudinal bore 18 in the lower module body 20. (See FIG. 14) A wound first compression spring 22 surrounds the disengagement plunger 16 and is constrained between a lower shoulder in the bore 24 and an upper shoulder on the disengagement plunger 26 so as to bias the disengagement plunger 16 to return to the upper position in the absence of any external forces.

Extending normally from the disengagement plunger 16 and protruding from a slot 28 in the lower module body 20 is a pin 30 that rises and lowers with movement of the disengagement plunger 16 so as to reside within or beyond the detents 32 in the shift gate plate 92. (See FIGS. 7 and 9). It is the mechanical interference between the pin 30 residing within the detents 32 that provides the safety lock out feature that prevents the transmission from being shifted into a wrong gear that would damage the vehicle or endanger the occupants.

When the lower module 4 is affixed to the shifter support assembly 94 the pin 30 resides adjacent the shift gate plate 92. When the disengagement plunger 16 is in the lower position such that the pin 30 has moved down slot 28 to extend from the bottom of the lower module body 20 (as best illustrated in FIGS. 6 and 7) the pin 30 clears the detents 32 in the shift gate plate 92. At this time the shifter shaft 8 may be manipulated to move the shift linkage 86 and shift device 2 (as they all move in unison) to change gears. When the disengagement plunger 16 does not experience any external downward force, the first compression spring 22 returns the disengagement plunger 16 to its upper position and the pin 30 matingly engages in whichever detent 32 it is lined up beside. Note the detents 32 in the shift gate 92 are arranged along an arc to compensate for the arc that the lower module 4 pivots through when the shift shaft 8 is moved.

When one wants to disengage the safety lock out with a push button, the shifter shaft 8 is threadingly engaged with a matingly threaded recess 84 in the top of the lower module 4. Since the shifter shaft 8 is hollow a flexible shaft 10 can reside in this hollow such that its distal end contacts the top of the disengagement plunger 16 and its proximate end contacts the underside of depressable button 14 in the button shift knob 12 that is threadingly engaged with the top of the shift shaft 8. Depressing the button 14 causes the flex shaft 10 to force downward the disengagement plunger 16 against its spring pressure and cause the pin 30 to move downward out of the detents 32 in the shift gate plate 92. This then disengages the safety lock out and allows all gears to be selected via the pivotal shift linkage 86. This is known as button shifting.

On the side of the lower module body 20 there are two substantially oblong slots 50 milled 180 degrees apart running parallel with the longitudinal axis of the lower module body 20. These slots align with a through orifice 52 in the disengagement plunger 16. Through this arrangement passes a rod 53 having a mechanical locking mechanism 54 affixed at either end of the rod 53. The rod 53 resides generally perpendicular to the first and second pivot arms 90 and 88. Since the rod 53 is now unitary with the disengagement plunger 16, downward movement of the rod 53 will also force down the disengagement plunger 16 against its spring pressure and cause the pin 30 to move downward out of the detents 32 in the shift gate plate 92. This in turn, disengages the safety lock out allowing all gears to be selected via the pivotal shift linkage 86.

The upper module 6 is designed to mechanically connect to the lower module 4 and to allow the disengagement plunger 16 to be raised and lowered by a simple sideways tilting of the shifter shaft 8 as will be discussed herein. To disconnect button shifting, the shifter shaft 8 is removed from the lower module 4 and the upper module 6 bolted to the lower module 4 by connection bolts 40 passing through the upper module's mounting bracket 56 and into matingly threaded recesses 44 in the lower module body 20. Then the flexible shaft 10 is removed and the shifter shaft 8 is connected to the upper module 6. The button shift knob 12 with the button 14 can then be replaced onto the shifter shaft 8 with any style of shift knob.

The upper module 6 is made up of an upper module body 42 that pivotally resides in a mounting bracket 56 via a pivot pin or bolt 59. In the upper module body, running perpendicular to the longitudinal axis of the pivot pin 59 is a stopped orifice 70 with a wound second compression spring 72 therein. This spring bears against one side of the upper end of the lower module body 20 and allows the shifter shaft 8 and the entire upper module body to tilt slightly when an external sideways force is applied to the shifter shaft 8. However, the force of the spring 72 returns the shifter shaft 8 and the upper module body 42 back to its original position when the external force is removed. (A tilt of as little as four degree has been shown to be sufficient to disengage the safety lock out.) In the preferred embodiment the lower module body 20 is generally rectangular and has a upper flange 45 formed about its upper end.

The upper module body has a threaded recess running therethrough to accept the shifter shaft 8 and the flexible shaft 10. The mounting bracket 56 has a series of orifices for the mechanical attachment to the upper flange 45 on the top end of the lower module body 20. In the preferred embodiment this connection is by bolts. On each side of the mounting bracket is affixed an angle arm 58. At the bottom end of each angle arm 58 is an angled ramp 60. When the upper module 6 is affixed to the lower module 4 the angle arms 58 reside adjacent and atop the rod 53 such that the upper end of the ramp 60 contacts the side of the rod 53. When the shifter shaft is tilted through a slight angle that lies approximately 90 degrees from the direction used for gear changes the upper module body 42 pivots and the angle arms 58 also pivot. This forces the angled ramp 60 to exert a sideways force upon the rod 53. Since the ramp is angled, this force causes the rod 53 (which is attached to the disengagement plunger 16) to move downward in the oblong slots 50 of the lower module body 20 therein compressing spring 22 and causing the pin 30 to move out of the detents 32 of the shift gate plate 92. This again disengages the safety lockout and allows all gears to be selected via the pivotal shift linkage 86. This is known as tilt shifting.

It is to be noted that although the shift device 2 is designed to allow the user to choose the type of safety lock out disengagement they wish, when the upper module 6 is mechanically coupled to the lower module 4 their respective central bores align such that if so desired, the flex shaft 10 could pass through both modules and the safety lock out could be disengaged both by depressing of the button 14 or tilting of the shift shaft 8.

FIGS. 2, 4, 6, 8, 10 and 12 illustrate various views of the modular automatic transmission shift device 2 with the upper module 6 attached to the lower module when the safety lock out is engaged. Here the pin 30 can be seen still residing within the lower module body 20 (FIGS. 6, 8, 10 and 12) and the upper section of the ramp 60 of the angle arms 58 just contacting the rod 53 (FIGS. 2 and 6). The upper module body 42 resides normal to the linear axis of the modular automatic transmission shift device 2 being biased into that resting position by second spring 72.

FIGS. 3, 5, 7, 9, 11 and 13 illustrate various views of the modular automatic transmission shift device 2 with the upper module 6 attached to the lower module when the safety lock out is disengaged. Comparing these view with those above it can be seen that when a sideways force is exerted to cause the shifter shaft 8 to tilt (FIG. 13) the upper module body 42 compresses second spring 72 and angles slightly from its resting position (FIGS. 5 and 7) causing the angle arms 58 to move sideways slightly and force the rod 53 to slide down the ramp 60 (FIG. 7.) This causes the rod to compress first spring 22 and move downward within its bore 18 (FIGS. 11 and 13) so as to cause pin 30 to extend below the bottom of the lower module body 20 (FIG. 9) and disengage from the detents 32 in the shift gate plate 92 (FIG. 15.)

The above description will enable any person skilled in the art to make and use this invention. It also sets forth the best modes for carrying out this mechanical linear pushbutton actuation device. The mechanical linear pushbutton actuation device allows a tiltable module to be coupled to a linear pushbutton so as to depress (actuate) the pushbutton with a tilting motion. There are numerous variations and modifications thereof that will also remain readily apparent to others skilled in the art, now that the general principles of the present invention have been disclosed. For example, there need not be two angle arms 58 and rod 53 need not extend out both sides of said lower module body 42. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A modular shift device for operating the safety lock out mechanism of an automatic transmission comprising:
   an upper module; and
   a lower module;
   wherein said upper module is adapted for mechanical connection to said lower module and is adapted for mechanical connection to a distal end of a shifter shaft, and wherein said lower module is pivotally affixed adjacent a shift gate to a shifter support assembly affixed to an automatic transmission, and wherein said lower module connects to a moveable gear linkage for shifting gears;
   wherein said lower module has a lower body with a moveable pin extending therefrom that is capable of mechanically cooperating with said shift gate to prevent unwanted engagement of said gears;
   wherein said lower body has a depressable plunger recessed within a bore formed there through said lower body, and a compression spring constrained between a shoulder on said bore and a shoulder on said plunger, and wherein said moveable pin resides on said plunger;
   wherein said plunger has a rod extending normally therefrom at least one side that protrudes through at least one oblong slot in said lower body; and
   wherein said upper module is comprised of an upper body that tiltably resides in a mounting bracket that is affixed to said lower body, and wherein said upper module has at least one arm having a first end pivotally affixed to said upper body and a second end with an angled section formed thereon that resides in contact with said rod outside of said lower body.

2. The modular shift device of claim 1 wherein said lower body has at least one pivot arm extending therefrom that pivotally connects said lower module to said shifter support assembly, allowing the shift device to pivot and move said gear linkage.

3. The modular shift device of claim 1 wherein said second end of said arm has an angled ramp formed thereon where said arm contacts said rod.

4. The modular shift device of claim 3 wherein tilting of said upper body relative to said lower body pivots said arm from said first end such that said angled ramp exerts pressure on said rod so as to push said rod and said plunger down in said bore to move said pin from mechanical cooperation with said shift gate.

5. The modular shift device of claim 4 wherein said rod protrudes normally therefrom two oblong slots in said lower body, and wherein said upper module has two arms each in contact with said rod outside said lower body.

6. The modular shift device of claim 5 wherein said upper body has a stopped bore formed therein and a second compression spring housed therein said bore with a first end in contact with said upper body and a second end in contact with said lower body so as to maintain said upper body in a non tilted state until an external force is exerted upon a shifter shaft attached to said upper module.

7. The modular shift device of claim 6 further comprising:
a first bore through said upper body;
a second bore through said shifter shaft wherein said first and said second bores are aligned;
a flex shaft slidingly received within said first bore and said second bore; and
a depressable button housed in a proximate end of said shifter shaft, said button operably connected to said depressable plunger by said flex shaft so as to urge said movable pin in and out of cooperation with said shift gate.

* * * * *